No. 759,472. Patented May 10, 1904.

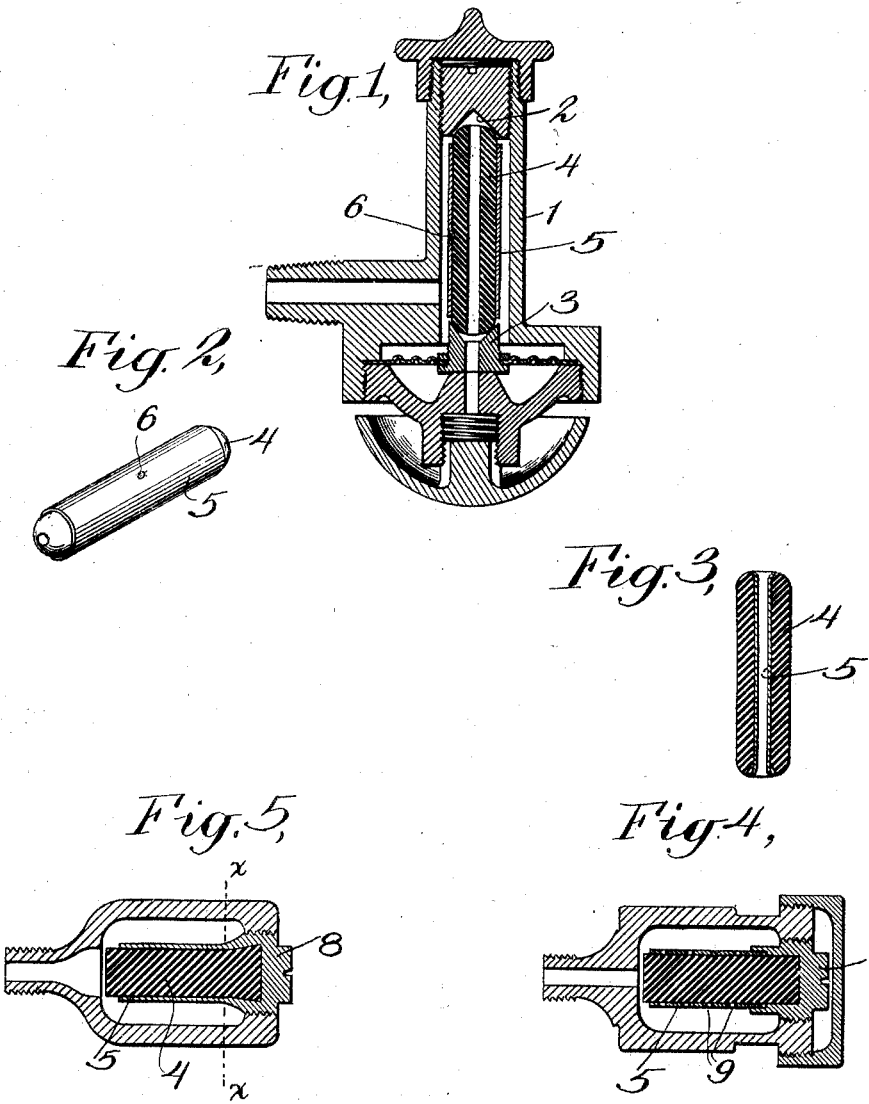

UNITED STATES PATENT OFFICE.

ALFRED ROESCH, OF BRIDGEPORT, CONNECTICUT, ASSIGNOR TO DAVIS & ROESCH TEMPERATURE CONTROLLING COMPANY, OF NEW YORK, N. Y., A CORPORATION OF NEW JERSEY.

THERMOSTAT.

SPECIFICATION forming part of Letters Patent No. 759,472, dated May 10, 1904.

Application filed January 27, 1903. Serial No. 140,700. (No model.)

*To all whom it may concern:*

Be it known that I, ALFRED ROESCH, of Bridgeport, in the county of Fairfield and State of Connecticut, have invented certain new and useful Improvements in Thermostats, of which the following is a specification.

My invention relates to improvements in thermostats, and particularly to thermostats subjected to wide variations in temperature, such as the thermostats employed in connection with steam-radiators. Thermostats so employed usually comprise a cylindrical thermostatic member composed of vulcanized rubber or similar material, which responds quickly to variations in temperature and has a somewhat high coefficient of expansion. I have found that such thermostatic members, however, are very liable to warp owing to the wide range of temperature to which they are subjected, and when so warped they often entirely fail to operate or operate very inefficiently. To overcome this defect, I have provided a thermostatic member with a rigid and laterally-unyielding stiffening-strip in engagement therewith substantially throughout the entire length of said member.

I will now proceed to describe a device embodying my invention, and will then point out the novel features in the claims.

In the drawings, Figure 1 is a view in vertical longitudinal section of a thermostat employing a thermostatic member embodying my invention. Fig. 2 is a perspective view of the thermostatic member detached. Fig. 3 illustrates a view in central section of a thermostatic member having a stiffening-piece arranged somewhat differently to that illustrated in Fig. 1. Figs. 4 and 5 show two other forms of thermostats and having the thermostatic members reinforced in accordance with my invention.

In Fig. 1 I have illustrated a form of thermostat invented by me and forming the subject-matter of a copending application, Serial No. 134,248, filed December 8, 1902. I make no claim to the thermostat as a whole herein, as the same is claimed in this copending application. In the said figure a suitable casing 1 is provided, having two abutments 2 and 3, between which a thermostatic member 4 is loosely disposed. The lower abutment has an aperture throughout and is, in effect, a valve-seat, for which the thermostatic member 4 is a valve. The thermostatic valve 4 is cylindrical in form and is provided exteriorly with a stiffening tube or strip 5 of metal or other rigid and laterally-unyielding material. The tube 5 may be retained in its proper position relatively to the member 4 by any suitable means, such as by friction or by having a portion thereof depressed to so engage the member at one point as to positively prevent longitudinal displacement yet to permit longitudinal relative movement of the other portions of the thermostatic member and stiffening-strip, due to their differences in coefficients of expansion.

In Figs. 1 and 2 the tube 5 is shown as depressed at the point 6 for this purpose. With this form of thermostat the member 4 is preferably hollow, and, if preferred, the stiffening tube or strip may be disposed within the hollow portion of the member, as at Fig. 3.

In Fig. 4 I have shown the conventional form of another thermostat in which the member 4 is supported at one end by a socket 7, the remainder of the thermostatic member being ordinarily entirely unsupported and free to be acted upon by changes of temperature of the fluid surrounding same. With such construction I similarly provide the thermostatic member with a stiffening tube or strip 5 substantially throughout its entire length, so as to prevent its warping.

In Fig. 5 I have shown conventionally yet another form of thermostat in which the thermostatic member is arranged upon expansion to enter an orifice disposed in line therewith. In the construction shown in this figure the thermostatic member is usually supported by a socket 8, which extends only so far as the dotted line $x\,x$ in Fig. 5.

In carrying out my invention I may construct the tube or strip 5 as an extension of the socket 8; but in such case the socket portion, extending from the line $x\,x$ inwardly, must hold the thermostatic member rigidly, while the remaining portion of the thermostatic member must be permitted to play longitudinally within the tube 5, so as to permit expansion and contraction thereof toward and away from the socket.

The tube 5 may be provided with perforations, as shown at 9 in Fig. 4, if desired, in order to permit the fluid surrounding same to act more directly upon the thermostatic member.

A further advantage of using a stiffening-strip of tubular form which embraces the thermostatic member substantially throughout its entire length is that longitudinal compression and consequent lateral expansion of the thermostatic member, due to the constant end pressure in certain forms of thermostats, is thereby obviated.

What I claim is—

1. The combination with a thermostatic member, of a metallic tube rigidly secured thereto at one point only in its length, but in intimate frictional engagement therewith substantially throughout the entire length of said member.

2. The combination with a thermostatic member, of a metallic tube surrounding same and rigidly secured thereto at one point only throughout its length, but in intimate frictional engagement therewith substantially throughout the entire length of said member.

3. The combination with a hollow cylindrical thermostatic member, of a metallic tube surrounding same and rigidly secured thereto at one point only throughout its length, but in intimate frictional engagement therewith substantially throughout the entire length of said member.

4. In a thermostat the combination with a casing having two abutments, of a thermostatic member loosely disposed between the two said abutments and a metallic tube surrounding same secured thereto at one point only throughout its length, but in intimate frictional engagement therewith substantially throughout the entire length of said member.

ALFRED ROESCH.

Witnesses:
D. HOWARD HAYWOOD,
C. F. CARRINGTON.